United States Patent Office 3,548,259
Patented Dec. 15, 1970

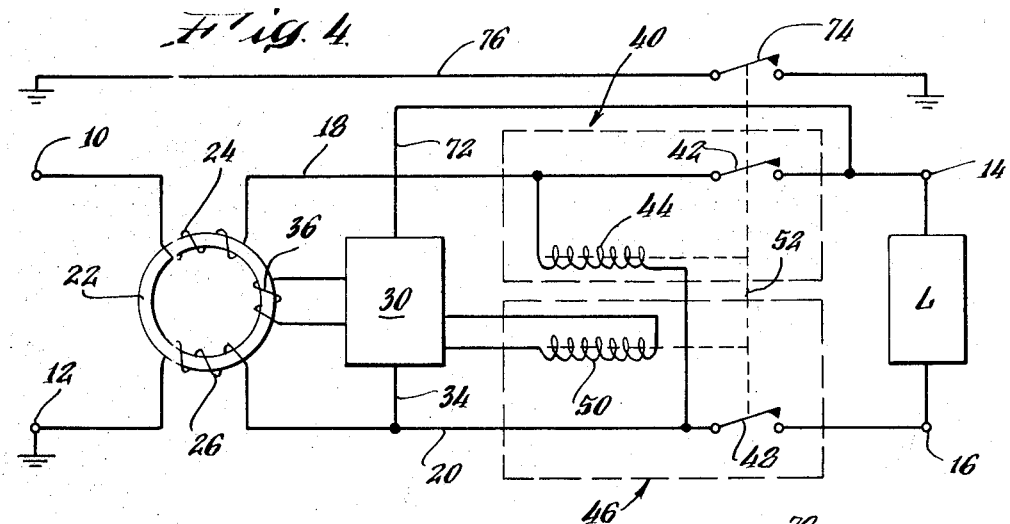
Fig. 4.
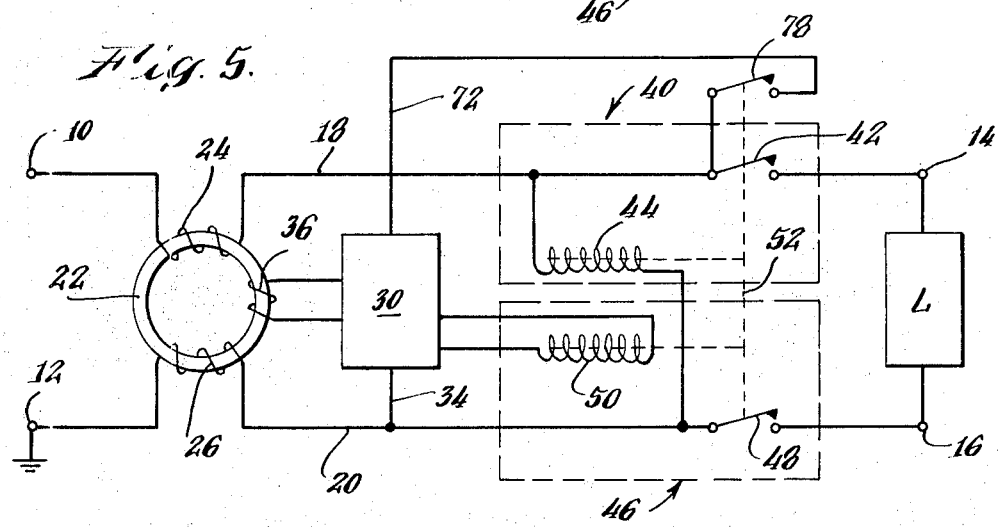
Fig. 5.
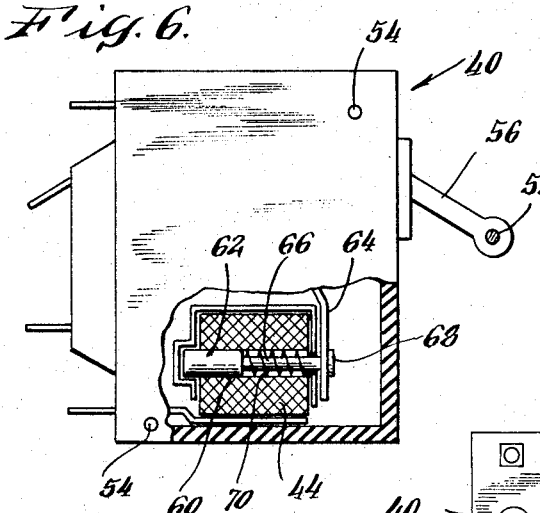
Fig. 6.
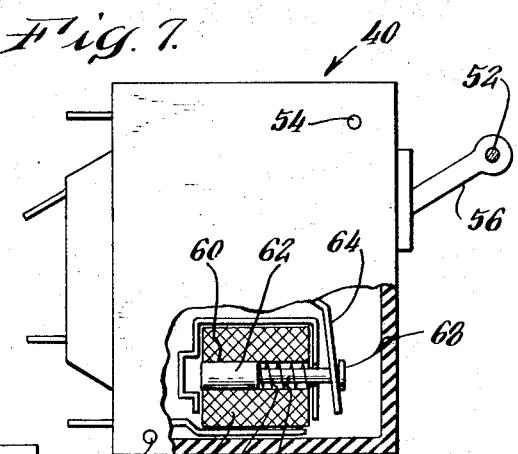
Fig. 7.
Fig. 8.
INVENTOR.
Thomas M. McDonald
BY
Wooster, Davis & Cifelli
ATTORNEYS.

3,548,259
GROUND FAULT CIRCUIT INTERRUPTER WITH UNDERVOLTAGE RELEASE
Thomas M. McDonald, Monroe, Conn., assignor to Harvey Hubbell, Incorporated, Bridgeport, Conn., a corporation of Connecticut
Filed Mar. 3, 1969, Ser. No. 803,555
Int. Cl. H02h *3/00, 3/10, 3/14, 3/28*
U.S. Cl. 317—18                            10 Claims

ABSTRACT OF THE DISCLOSURE

There is disclosed a ground fault circuit interrupter having a pair of ganged circuit breakers, one in each conductor supplying the load. A differential transformer has a primary winding in series with each conductor and a secondary winding connected to a sensing circuit. The sensing circuit operates one of the circuit breakers when an unbalance occurs in the line conductors. The other circuit breaker includes an undervoltage coil which is connected between the line conductors and permits the circuit breakers to be closed only when sufficient voltage exists between the line conductors.

BACKGROUND OF THE INVENTION

This invention relates to ground fault circuit interrupters and, more particularly, to an interrupter that will protect against ground faults even if a line fault is present.

Ground fault circuit interrupters are assuming an ever-increasing role in the field of electrical wiring. These devices are designed primarily for the protection of individuals from electric shock. They commonly employ differential transformers for the detection of current unbalance in the conductors supplying the load. A differential transformer may comprise, for example, a single closed magnetic core upon which are positioned a pair of primary windings, each in series with one of the two conductors supplying the load. These windings are so wound that, under normal current conditions, the fluxes which they produce in the core are equal and opposite and, therefore, cancel each other out. A secondary winding on the core is connected to a sensing system which, in turn, operates a circuit breaker. If a leak to ground develops, such as, for example, by a portion of the total current passing through a person's body, an unbalanced current condition results and a voltage is developed across the secondary winding. This secondary voltage is sensed by the sensing circuit which trips the circuit breaker. This action is so rapid that electrical shock is prevented.

Although ground fault circuit interrupters are a major advance in electrical protection, those known to the prior art still have certain disadvantages which it would be desirable to overcome. One such disadvantage arises from the fact that the conductors that supply the primary winding form the power supply for the sensing circuit. If the neutral line should open on the supply side of the transformer, the sensing circuit would be inoperative but an electric shock would still be possible from the line side. A somewhat similar disadvantage may occur if an undervoltage condition should exist. If the supply voltage should drop below the operating voltage of the sensing circuit, it would become inoperable and therefore unable to provide the desired protection. Another disadvantage in prior art interrupters is that the sensing circuit is energized at all times, whether the associated breakers are open or closed. This results in undesirable heating and more rapid aging of components in the sensing circuit and, more importantly, makes it necessary to provide special reset circuits to enable the circuit breaker to be closed following a fault.

As will be obvious to those skilled in the art, there are a number of known ways for protecting a circiut against undervoltage and no-voltage conditions. However, in each instance these require separate circuit breakers. It would be desirable to provide a single circuit breaker unit which would be actuated by either a ground fault or an undervoltage condition. Accordingly, it is an object of the present invention to provide a single circuit breaker unit for a ground fault circuit interrupter which is operable on either ground faults or line faults. Other objects are to provide such an interrupter wherein the sensing circuit is deenergized when the breakers are open but energized when they close, and to provide such a circuit wherein no separate reset mechanism is required.

SUMMARY OF THE INVENTION

The foregoing objects are achieved by means of a ground fault circuit interrupter in accordance with this invention which comprises first and second input terminals connectable to an electrical power supply and first and second outut terminals connectable to an electrical load. A first conductor connects the first input and first output terminals and a second conductor connects the second input and second output terminals. First and second circuit breaker means are provided, respectively, in the first and second conductors and these circuit breakers are mechanically interlocked so that their make and break actions are coordinated. Means for detecting unbalanced currents in the first and second conductors is included which produces a tripping signal responsive to such unbalance. A sensing circuit which is energized from the first and second conductors when the circuit breakers are closed is responsive to a tripping signal produced by the detection means for energizing the tripping coil of one of the breakers. The other breaker includes an undervoltage coil which is connected across the first and second conductors so as to open the breaker only when the voltage across its coil drops below a preselected minimum value.

BRIEF DESCRIPTION OF THE DRAWINGS

An understanding of this invention may best be had by reference to the following description taken with the accompanying drawings wherein:

FIG. 4 is a circuit diagram of a further modification of the circuit of this invention;
FIG. 5 is a circuit diagram of a still further modification of the circuit of this invention;
FIG. 6 is a side elevational view of a double circuit breaker unit usable in this invention, a portion thereof being cut away to illustrate the internal construction of one breaker;
FIG. 7 is a view similar to FIG. 6, illustrating the operation of the circuit breaker unit;
and
FIG. 8 is a front view of the double circuit breaker unit of FIGS. 6 and 7.

DESCRIPTION OF THE PREFERRED EMBODIMENTS

Figure 1:
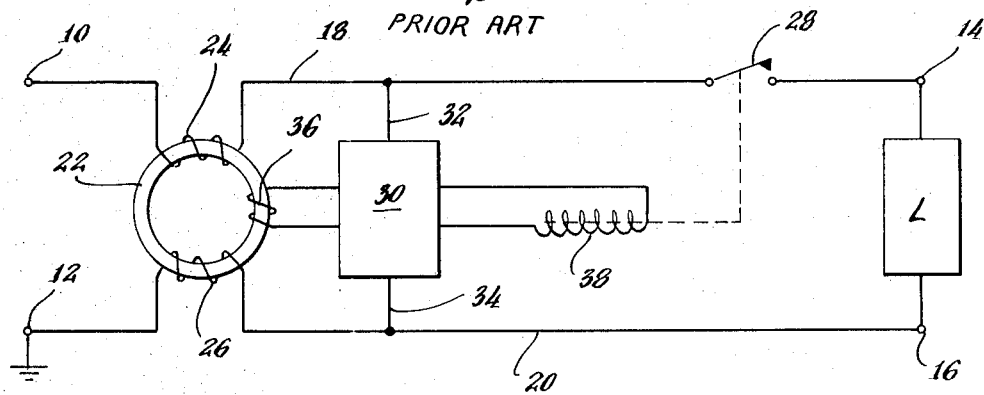
FIG. 1 is a circuit diagram of a prior art circuit.

To best understand the present invention, attention is first directed to the prior art ground fault circuit interrupter shown in FIG. 1. This circuit includes input terminals 10, 12 for connection to a power supply, and output terminals 14, 16 which may be connected to a load L. A line conductor 18 interconnects terminals 10 and 14 and a grounded neutral conductor 20 interconnects terminals 12 and 16. A differential transformer having a toroidal core 22 includes a first primary winding 24 connected in series with conductor 18 and a second primary winding 26 connected in series with conductor 20. The pole 28 of a circuit breaker is also connected in line 18. A sensing circuit 30 is connected between conductors 18, 20 by means of conductors 32, 34. The input to sensing circuit 30 is derived from a secondary winding 36 on core 22 and its output is applied to the tripping coil 38 of pole 28. The sensing circuit 30 is not illustrated in detail and a number of such circuits are available and may be used with this invention. However, a description of a suitable circuit may be had by reference to the copending patent application of Robert M. Murphy and Alvin R. Moris, Ser. No. 740,662 filed June 27, 1968, entitled Ground Leakage Current Interrupter, and assigned to the same assignee as the present invention.

One of the major disadvantages with the circuit of FIG. 1 may be best understood by assuming an open circuit fault to occur between terminal 12 and primary winding 26 in the grounded neutral conductor. Assuming breaker pole 28 to be closed when this occurs, it will be noted that the entire circuit from input terminal 10 to the point of the break will be fully charged at line voltage. The sensing circuit 30, however, will be completely inoperable because no potential difference will exist between conductors 32 and 34. Thus, a very dangerous condition wil exist and a shock hazard will exist for anyone coming in contact with the energized portion of the circuit or the load. Even assuming the absence of a break, a somewhat similar condition will be seen to exist if the supply voltage across terminals 10, 12 should fall below that required to operate sensing circuit 30. Under these conditions, a ground fault which could conceivably cause injury would not activate the tripping mechanism.

Figure 2:
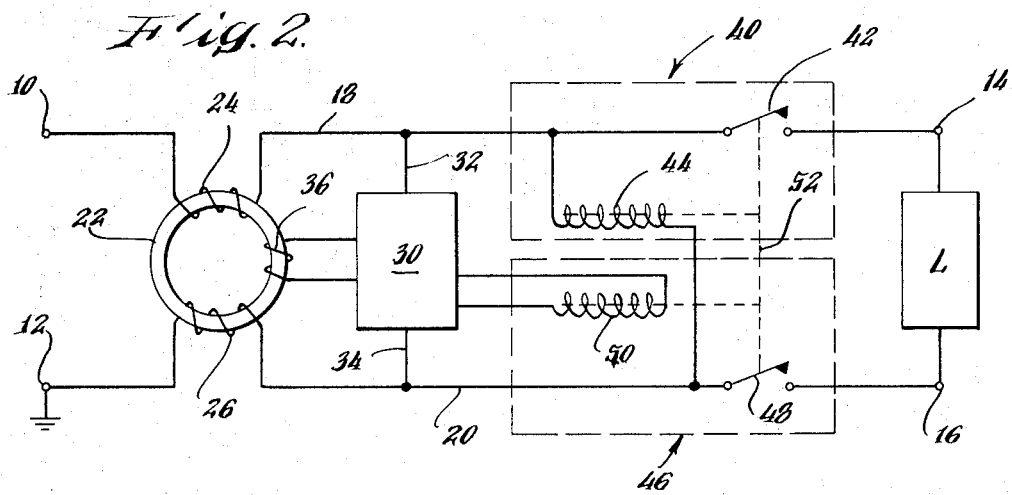
FIG. 2 is a circuit diagram of a circuit in accordance with this invention.

In FIG. 2 there is illustrated one form of the invention. In many respects, the circuit is similar to that of FIG. 1 and, accordingly, identical reference numerals are employed where appropriate. It differs, however, in that two single pole circuit breakers are employed. These include a line fault circuit breaker 40 having a pole 42 in line conductor 18 and an undervoltage release coil 44 connected between line conductor 18 and grounded neutral conductor 20. A ground fault circuit breaker 46 has its pole 48 in conductor 20 and includes a ground fault tripping coil 50 which is energized from sensing circuit 30. Each of the circuit breakers may be tripped by its respective coil but the poles 42, 48 are interconnected by a mechanical ganging rod 52. The relationships of the two circuit breakers is illustrated more clearly in FIGS. 6–8, wherein it will be noted that they are mounted together by means of pins 54 to form, in effect, a double pole unit with their toggles 56, 58 being interconnected by the ganging rod 52.

The mechanical construction of the tripping mechanism of breaker 46 is substantially conventional and need not be described in detail. However, the construction of the trip coil mechanism of breaker 40 does require some explanation. As is well known to those skilled in the art, the usual trip coil of a single pole breaker of this type is designed so that, when the coil is energized, it retracts a magnetized core which depresses an actuator lever activating the tripping mechanism. In the disclosed modification, however, this action is reversed so that breaker 40 is caused to trip when its coil 44 is deenergized. This is accomplished by forming its core 60 with an enlarged end portion 62 remote from the actuator 64 and a reduced neck 66 which extends through a slot in the actuator and engages it by means of an enlarged head 68. When the coil 44 is deenergized, the core 60 is retained in the position illustrated in FIG. 6 by means of a spring 70, thus keeping the actuator 64 depressed and breaker 40 in its tripping mode and thus uncloseable. Due, however, to the disparity in size between the end portion 62 and neck 66 the core 60 has its center of gravity shifted considerably to the left of the center line of the coil 44 as seen in FIG. 6. Thus, upon energization of the coil, core 60 moves to the right, or in a reverse direction from those known to the prir art. This causes the head 68 to move outwardly, as shown in FIG. 7, thereby releasing the actuator 64 and making it possible to close the circuit breaker.

Referring back to FIG. 2 it will be noted that the coil 44 is connected across the line conductors 18, 20 and thus permits the circuit breakers to be closed only when sufficient voltage exists across these conductors. Under a no-voltage or reduced voltage condition, the breakers will trip, or in the alternative, cannot be closed. Thus, the situation previously described with respect to FIG. 1 can no longer occur as any break in either conductor will prevent the load from being energized.

Figure 3:
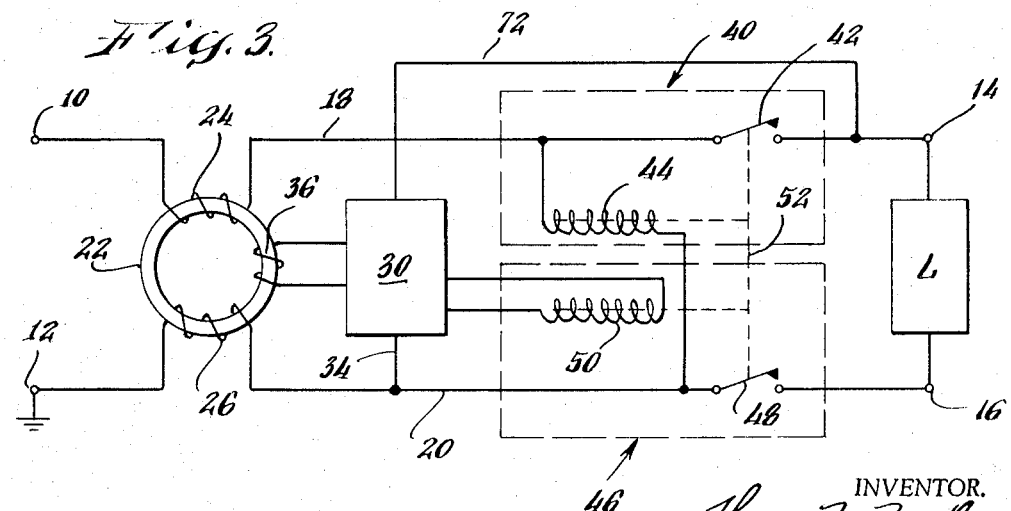
FIG. 3 is a circuit diagram of a modification of the circuit of this invention.

In the modification of the invention shown in FIG. 2 it will be noted that the sensing circuit 30 remains energized at all times. This has the disadvantages referred to above of unnecessary heating of circuit components and, possibly more importantly, requiring a reset circuit. In the modification of FIG. 3, however, these disadvantages are obviated by connecting one side of the sensing circuit 30 to the load side of circuit breaker 40 by means of conductor 72. It will now be apparent that, as sensing circuit 30 is energized only through pole 42, no reset circuit is required. Sensing circuit 30 is normally deenergized when the breakers are open. In order to insure safety, it is desirable to sequence the breakers so that pole 42 closes before pole 48. This may be done mechanically in any of the ways known to the prior art such as, for example, reduced spacing of the contacts of breaker 40. Upon the closing of breakers 40, 46, pole 42 will close first, thus insuring that sensing circuit 30 is energized before the load connection is fully made.

The modification of FIG. 4 is quite similar to that of FIG. 3 except that one additional pole 74 is connected in a grounding conductor 76. In this modification, the poles would be sequenced in the order 74, 42, 48 in order to insure full grounding before load energization.

In FIG. 5 there is illustrated a modification of the invention which is electrically quite similar to that of FIG. 3 but is somewhat cheaper because it dispenses with the necessity for sequencing breaker poles. In this modification, the conductor 72 for energizing sensing circuit 30 is connected through an auxiliary switch 78 to the supply side of breaker 40. The auxiliary switch 78 is also ganged with poles 42, 48 but is designed to close before these poles. Accordingly, in this modification sequencing of breaker poles becomes unnecessary. It will also be obvious that a third breaker could be provided for a separate grounding conductor and ganged with breakers 40, 46. In addition, this third breaker could be provided with an overload coil in order that overlaid, undervoltage, and ground fault protection could be provided from the same combination unit.

It is believed that the many advantages of this invention will now be apparent to those skilled in the art. It will also be apparent that a number of variations and modifications may be made in this invention without departing from its spirit and scope.

What is claimed is:

1. A ground fault circuit interrupter which comprises: first and second input terminals connectable to an electrical power supply; first and second output terminals connectable to an electrical load; a first conductor connecting said first input and first output terminals; a second conductor connecting said second input and second output terminals; first circuit breaker means in said first conductor; second circuit breaker means in said second conductor; means mechanically interlocking said first and second circuit breakers to coordinate their make and break actions; means for detecting unbalanced currents in said first and second conductors and producing a tripping signal responsive thereto; a tripping coil connected to open said first circuit breaker means when energized; sensing circuit means energized from said first and second conductors and responsive to said tripping signal to energize said tripping coil; and an undervoltage coil across said first and second conductors connected to open said second circuit breaker means when the voltage thereacross drops below a preselected minimum value.

2. The interrupter of claim 1 wherein said sensing circuit means is energized from the load side of one of said circuit breaker means.

3. The interrupter of claim 2 wherein said one circuit breaker means closes in advance of the other circuit breaker means.

4. The interrupter of claim 1 additionally including auxiliary switch means mechanically interconnected with said first and second circuit breaker means to close in advance thereof, said sensing circuit means being energized through said auxiliary switch means.

5. The interrupter of claim 1 wherein said undervoltage coil encloses a longitudinally movable magnetizable core in operative relationship with the actuator of said second circuit breaker means to move said actuator to its tripping position when said coil is deenergized.

6. The interrupter of claim 1 wherein said sensing circuit means is energized only when at least one of said circuit breakers is closed.

7. The interrupter of claim 1 wherein said first and second circuit breaker means are of the toggle type and wherein said mechanical interlocking means comprises a ganging rod interconnecting the toggles.

8. The interrupter of claim 1 additionally including third circuit breaker means mechanically interlocked with said first and second circuit breaker means and connectable in a grounding conductor.

9. The interrupter of claim 8 wherein said second conductor is a line conductor and said first conductor is a grounded neutral conductor.

10. The interrupter of claim 9 wherein said current breakers close in the sequence: third, second, first.

References Cited

UNITED STATES PATENTS

| | | | |
|---|---|---|---|
| 3,187,225 | 6/1965 | Mayer | 317—26 |
| 3,376,477 | 4/1968 | Weinger | 317—27 |
| 3,473,091 | 10/1969 | Morris | 317—18 |

J. D. MILLER, Primary Examiner

U. WELDON, Assistant Examiner

U.S. Cl. X.R.

317—9, 27, 31, 46, 60